(12) United States Patent
Tremblay

(10) Patent No.: US 12,718,430 B2
(45) Date of Patent: Aug. 25, 2026

(54) METHODS AND SYSTEMS RELATING TO DIGITAL MARK OPACITY, BLENDING AND CANVAS TEXTURE

(71) Applicant: COREL CORPORATION, Ottawa (CA)

(72) Inventor: Christopher Tremblay, Cantley (CA)

(73) Assignee: Corel Corporation, Ottawa (CA)

( * ) Notice: Subject to any disclaimer, the term of this patent is extended or adjusted under 35 U.S.C. 154(b) by 226 days.

(21) Appl. No.: 18/337,748

(22) Filed: Jun. 20, 2023

(65) Prior Publication Data

US 2023/0410391 A1 Dec. 21, 2023

Related U.S. Application Data

(60) Provisional application No. 63/353,798, filed on Jun. 20, 2022.

(51) Int. Cl.
*G06T 11/10* (2026.01)
*G06T 11/23* (2026.01)

(52) U.S. Cl.
CPC .............. *G06T 11/10* (2026.01); *G06T 11/23* (2026.01); *G06T 2200/24* (2013.01)

(58) Field of Classification Search
CPC .. G06T 11/001; G06T 11/203; G06T 2200/24
See application file for complete search history.

(56) References Cited

U.S. PATENT DOCUMENTS

| | | | | |
|---|---|---|---|---|
| 6,970,169 B1 * | 11/2005 | Harris | G06T 11/10 | 345/441 |
| 10,235,778 B2 * | 3/2019 | Bloomfield | G06F 3/04883 | |
| 2003/0035917 A1 * | 2/2003 | Hyman | B41M 5/36 | 524/106 |
| 2007/0216684 A1 * | 9/2007 | Hsu | G06T 11/60 | 345/441 |
| 2013/0120433 A1 * | 5/2013 | DiVerdi | G06F 3/03545 | 345/593 |
| 2014/0225903 A1 * | 8/2014 | Tremblay | G06F 3/01 | 345/501 |
| 2016/0042534 A1 * | 2/2016 | Tremblay | G06T 11/10 | 345/586 |
| 2016/0328866 A1 * | 11/2016 | Neulander | B44F 11/02 | |
| 2018/0260984 A1 * | 9/2018 | Severenuk | G06T 11/23 | |
| 2022/0283699 A1 * | 9/2022 | Presley | G06T 5/70 | |

* cited by examiner

*Primary Examiner* — Michael Le
(74) *Attorney, Agent, or Firm* — Rosenberg, Klein & Lee

(57) ABSTRACT

Predefined mark making tools within graphics applications address initial or final stages of a stroke whilst jitter addresses the intervening section of the stroke. Whilst this allows a brush stroke to be simulated as having increasing pressure initially, pressure variability during the stroke, and ending with decreasing pressure this approach does not reflect or mimic the artist's reality. This reality is that an artist applying multiple strokes of a medium, e.g. watercolour, pastels, oils, etc., with an applicator, e.g. a brush, pen, airbrush, marker, sponge or a knife, to a canvas where brush marks may accumulate. Prior art mark making tools and software do not account for aspects of opacity, grain (of the underlying canvas), and blending (of the multiple strokes). Accordingly, there are provided controls with respect mark making tools that address these aspects providing the digital artist with increased control, increased reproducibility, and incorporation of real world effects.

8 Claims, 9 Drawing Sheets

METHODS AND SYSTEMS RELATING TO DIGITAL MARK OPACITY, BLENDING AND CANVAS TEXTURE

CROSS-REFERENCE TO RELATED APPLICATIONS

This patent application claims the benefit of priority as a U.S. formal patent application claiming the benefit of priority from U.S. Provisional Patent Application 63/353,798 filed Jun. 20, 2022; the entire contents of which are incorporated herein by reference.

FIELD OF THE INVENTION invention relates to digital imagery and more particularly to reducing visual perceptions of digital generation and providing mark making tools with improved blending of marks from mark making tools and simulating the impact of underlying structure of a real work canvas being simulated by a virtual canvas.

BACKGROUND OF THE INVENTION

Digital graphics and digital image editing are the processes of creating and/or modifying digitally generated or digitally acquired and stored image data. Using specialized software programs, users may create, generate, manipulate, edit and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets. Similarly, digital graphics editors may include programs of differing complexity, such as limited-purpose programs associated with acquisition devices (e.g., digital cameras and scanners with bundled or built-in programs for managing colour balance or applying specific graphics effects); limited editors suitable for relatively simple graphics generation (e.g., for example as part of general suites of software for business and/or residential users); and professional-grade programs with large and complex feature sets (e.g., simulating different artistic formats such as watercolour, calligraphy, pastels, oils, etc. with various applicators including various brushes, pens, air brushes, markers, sponges and knives).

An operation often provided by digital graphics and digital image editors is the use of a virtual "paintbrush" (also referred to herein as a "brush", "brush tool", or mark making tool) to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image.

Some existing digital painting applications create strokes by repeatedly applying a stamp at incremental positions along a path. The stamp consists of a 2D array of pixels that represent what the "brush" looks like at an instant in time. By repeatedly applying the stamp at close spacing, the effect of the brush being dragged continuously across the canvas is created, in the form of an elongated stroke. Some existing applications provide multiple settings for users to control the appearance of the stroke, e.g. size, opacity, mark making tool, and brush style. However, such applications led to uniform marks being made by the mark making tool along the stroke or subsequent strokes as the same process as applied by the software application at each point along the stroke. Accordingly, most existing applications in order to increase the realism of strokes by simulating varying user tool handling, pressure, angle of tool, etc. provide for the application of predefined functions and/or jitter to the values of the mark making tool within the stroke. Predefined functions address, for example, the initial or final stages of a stroke for the application of a brush to canvas whilst jitter addresses the intervening section of the stroke. In this manner, a brush stroke may be simulated as having increasing pressure at the beginning of stroke, some variability in pressure during the stroke, and decreasing pressure at the end of the stroke.

However, a problem with this approach is that the results do not reflect or mimic the reality of an artist applying multiple strokes of a medium, e.g. watercolour, pastels, oils, etc.) with an applicator (e.g. a brush, pen, air brush, marker, sponge or a knife) to a canvas where brush marks may accumulate. This arises as prior art mark making tools and software do not account for aspects of opacity, grain (of the underlying canvas), and blending (of the multiple strokes). Accordingly, it would be beneficial to provide digital artists with controls with respect mark making tools that address these aspects providing the digital artist with increased control, increased reproducibility, and incorporation of real world effects.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to digital imagery and more particularly to reducing visual perceptions of digital generation and providing mark making tools with improved blending of marks from mark making tools and simulating the impact of underlying structure of a real work canvas being simulated by a virtual canvas.

In accordance with an embodiment of the invention there is provided a method comprising:

receiving one or more user inputs relating to one or more settings employed by a graphics engine forming part of a graphics application in execution upon a microprocessor;

receiving one or more other user inputs defining application of a mark making tool with respect to a virtual canvas; and generating with the graphics engine in dependence upon the one or more user inputs and the one or more user inputs an opacity of a mark made by the mark making tool during its application.

In accordance with an embodiment of the invention there is provided a method comprising:

establishing a paper texture from a set of paper textures based upon a selection by a user;

receiving one or more user inputs relating to one or more settings employed by a graphics engine forming part of a graphics application in execution upon a microprocessor;

receiving one or more other user inputs defining application of a mark making tool with respect to a virtual canvas; and generating with the graphics engine in dependence upon the one or more user inputs, the one or more user inputs, and the paper texture an opacity of a mark made by the mark making tool during its application In accordance with an embodiment of the invention there is provided a method comprising:

generating with a graphics engine in dependence upon the user inputs relating to settings of the graphics engine and the other user inputs defining application of a mark making tool with respect to a virtual canvas an opacity of a region of the virtual canvas to which a mark made by the mark making tool during its application; wherein the opacity is generated in dependence upon the mark applied and previous marks applied with other mark making tools in the region of the virtual canvas; and the opacity after the application of the mark is one of an increase in opacity and a reduction in opacity prior to the application of the mark.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
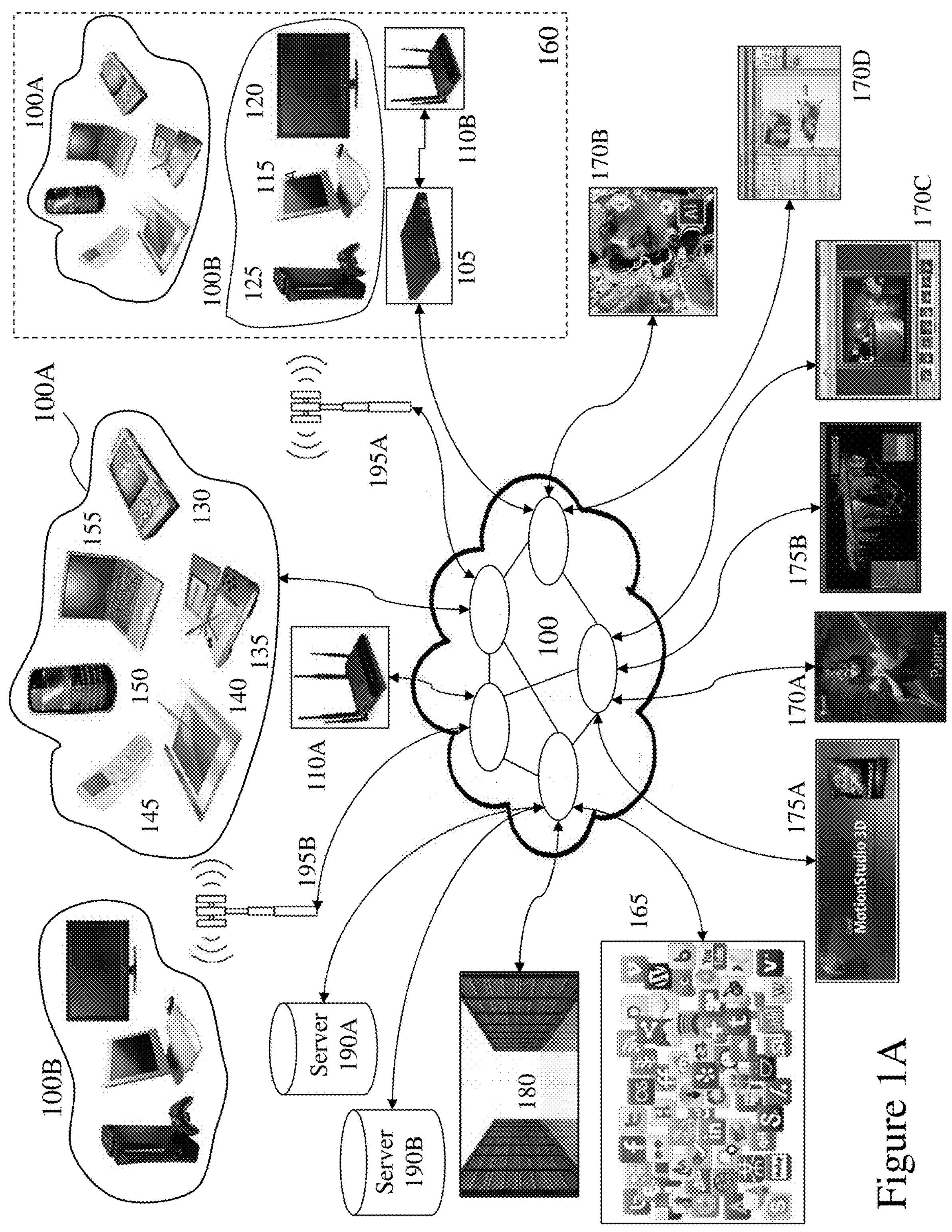
FIG. 1A depicts a network environment within which embodiments of the invention may be employed.

The present invention is directed to digital imagery and more particularly to reducing visual perceptions of digital generation and providing mark making tools with improved blending of marks from mark making tools and simulating the impact of underlying structure of a real work canvas being simulated by a virtual canvas.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An “enterprise” as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A “service provider” as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A ‘third party’ or “third party provider” as used herein may refer to, but is not limited to, a so-called “arm’s length” provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A “user” as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application.

A “wearable device” or “wearable sensor” relates to miniature electronic devices that are worn by the user including those under, within, with or on top of clothing and are part of a broader general class of wearable technology which includes “wearable computers” which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

“Electronic content” (also referred to as “content” or “digital content”) as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a “document” as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as “content” of the document. A document may include “structured data” containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. “Document information” as used herein may refer to, but is not limited to, may include any information included in the document, information derivable from information included in the document (referred to as “document derived information”), and/or information related to the document (referred to as “document related information”), as well as an extensions of such information (e.g., information derived from related information). An example of document derived information is a classification based on textual content of a document. Examples of document related information include document information from other documents with links to the instant document, as well as document information from other documents to which the instant document links.

A “mark making tool”, also referred to as a “mark tool” or “marking tool”, as used herein may refer to, a tool for applying a visual effect to a graphics image within a software application including, for example, a graphics generating tool, a graphics editing tool, and an image processing tool. Accordingly, a mark making tool may simulate real and unreal systems for the application, removal, or modification of information including, but not limited to, colour, texture, and content to a graphics image. As such a mark making tool may include, but is not limited to, a brush, an air brush, a pen, a pencil, a nib, a spray can, a sprayer, a sponge, a knife, a mathematical algorithm, a physical system of elements obeying physical laws, and a physical system obeying non-physical laws.

A “gesture”, also referred to as a “motion” or “input”, as used herein may refer to, an action resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface and a haptic interface.

A "gesture characteristic", also referred to as a "gesture expression" or an "expression", as used herein may refer to an aspect of a gesture exploited within a software application to modify a value relating to a mark making tool within the software application. As such a gesture characteristic or expression may include, but not be limited, velocity, direction, pressure, wheel, tilt, bearing, rotation, source of the gesture, and random. A source of the gesture may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

Referring to FIG. 1A there is depicted a network environment 100 within which embodiments of the invention may be employed supporting graphics editing systems and graphics editing applications/platforms (GESGEAPs) according to embodiments of the invention. Such GESGEAPs, for example including digital graphics editor and digital painting applications. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160. within which are other first and second user groups 100A and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 or Bluetooth as well in an ad-hoc manner.

Also connected to the network 100 are Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™, as well as first and second servers 190A and 190B which together with others, not shown for clarity. First and second servers 190A and 190B may host according to embodiments of the inventions multiple services associated with a provider of graphics editing systems and graphics editing applications/platforms (GESGEAPs); a provider of a SOCNET or Social Media (SOME) exploiting GESGEAP features; a provider of a SOCNET and/or SOME not exploiting GESGEAP features; a provider of services to PEDS and/or FEDS; a provider of one or more aspects of wired and/or wireless communications; an Enterprise 160 exploiting GESGEAP features; license databases; content databases; image databases; content libraries; customer databases; websites; and software applications for download to or access by FEDs and/or PEDs exploiting and/or hosting GESGEAP features. First and second primary content servers 190A and 190B may also host for example other Internet services such as a search engine, financial services, third party applications and other Internet based services.

Accordingly, a graphics designer and/or user (GRADUS or user) may exploit a PED and/or FED within an Enterprise 160, for example, and access one of the first or second primary content servers 190A and 190B respectively to perform an operation such as accessing/downloading an application which provides GESGEAP features according to embodiments of the invention; execute an application already installed providing GESGEAP features; execute a web based application providing GESGEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
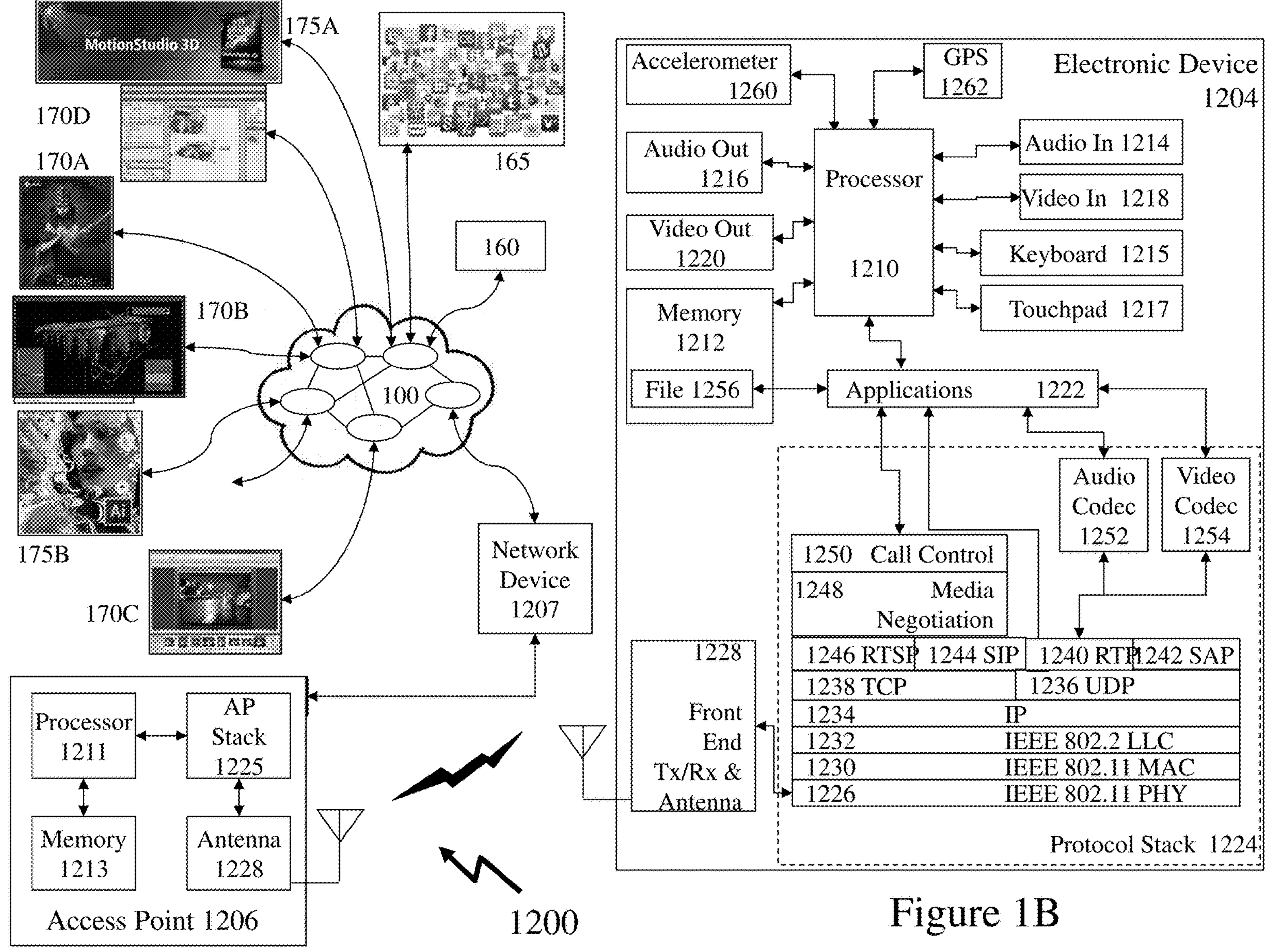
FIG. 1B depicts a wireless portable electronic device supporting communications to a network such as depicted in FIG. 1A and as supporting embodiments of the invention.

Now referring to FIG. 1B there is depicted an electronic device 1204 and network access point 1207 supporting GESGEAP features according to embodiments of the invention. Electronic device 1204 may, for example, be a PED and/or FED and may include additional elements above and beyond those described and depicted. Also depicted within the electronic device 1204 is the protocol architecture as part of a simplified functional diagram of a system 1200 that includes an electronic device 1204, such as a smartphone 155, an access point (AP) 1206, such as first AP 110, and one or more network devices 1207, such as communication servers, streaming media servers, and routers for example such as first and second servers 190A and 190B respectively. Network devices 1207 may be coupled to AP 1206 via any combination of networks, wired, wireless and/or optical communication links such as discussed above in respect of FIG. 1 as well as directly as indicated. Network devices 1207 are coupled to network 100 and therein Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™. The electronic device 1204 includes one or more processors 1210 and a memory 1212 coupled to processor(s) 1210. AP 1206 also includes one or more processors 1211 and a memory 1213 coupled to processor(s) 1210. A non-exhaustive list of examples for any of processors 1210 and 1211 includes a central processing unit (CPU), a digital signal processor (DSP), a reduced instruction set computer (RISC), a complex instruction set computer (CISC) and the like. Furthermore, any of processors 1210 and 1211 may be part of application specific integrated circuits (ASICs) or may be a part of application specific standard products (ASSPs). A non-exhaustive list of examples for memories 1212 and 1213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1204 may include an audio input element 1214, for example a microphone, and an audio output element 1216, for example, a speaker, coupled to any of processors 1210. Electronic device 1204 may include a video input element 1218, for example, a video camera or camera, and a video output element 1220, for example an LCD display, coupled to any of processors 1210. Electronic device 1204 also includes a keyboard 1215 and touchpad 1217 which may for example be a physical keyboard and touchpad allowing the user to enter content or select functions within one of more applications 1222. Alternatively the keyboard 1215 and touchpad 1217 may be predetermined regions of a touch sensitive element forming part of the display within the electronic device 1204. The one or more applications 1222 that are typically stored in memory 1212 and are executable by any combination of processors 1210. Electronic device 1204 also includes accelerometer 1260 providing three-dimensional motion input to the process 1210 and GPS 1262 which provides geographical location information to processor 1210.

Electronic device 1204 includes a protocol stack 1224 and AP 1206 includes a communication stack 1225. Within system 1200 protocol stack 1224 is shown as IEEE 802.11 protocol stack but alternatively may exploit other protocol stacks such as an Internet Engineering Task Force (IETF) multimedia protocol stack for example. Likewise AP stack 1225 exploits a protocol stack but is not expanded for clarity. Elements of protocol stack 1224 and AP stack 1225 may be implemented in any combination of software, firmware and/or hardware. Protocol stack 1224 includes an IEEE 802.11-compatible PHY module 1226 that is coupled to one or more Front-End Tx/Rx & Antenna 1228, an IEEE 802.11-compatible MAC module 1230 coupled to an IEEE 802.2-compatible LLC module 1232. Protocol stack 1224 includes a network layer IP module 1234, a transport layer User Datagram Protocol (UDP) module 1236 and a transport layer Transmission Control Protocol (TCP) module 1238.

Protocol stack 1224 also includes a session layer Real Time Transport Protocol (RTP) module 1240, a Session Announcement Protocol (SAP) module 1242, a Session Initiation Protocol (SIP) module 1244 and a Real Time Streaming Protocol (RTSP) module 1246. Protocol stack 1224 includes a presentation layer media negotiation module 1248, a call control module 1250, one or more audio codecs 1252 and one or more video codecs 1254. Applications 1222 may be able to create maintain and/or terminate communication sessions with any of devices 1207 by way of AP 1206. Typically, applications 1222 may activate any of the SAP, SIP, RTSP, media negotiation and call control modules for that purpose. Typically, information may propagate from the SAP, SIP, RTSP, media negotiation and call control modules to PHY module 1226 through TCP module 1238, IP module 1234, LLC module 1232 and MAC module 1230.

It would be apparent to one skilled in the art that elements of the electronic device 1204 may also be implemented within the AP 1206 including but not limited to one or more elements of the protocol stack 1224, including for example an IEEE 802.11-compatible PHY module, an IEEE 802.11-compatible MAC module, and an IEEE 802.2-compatible LLC module 1232. The AP 1206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 1204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 1C:
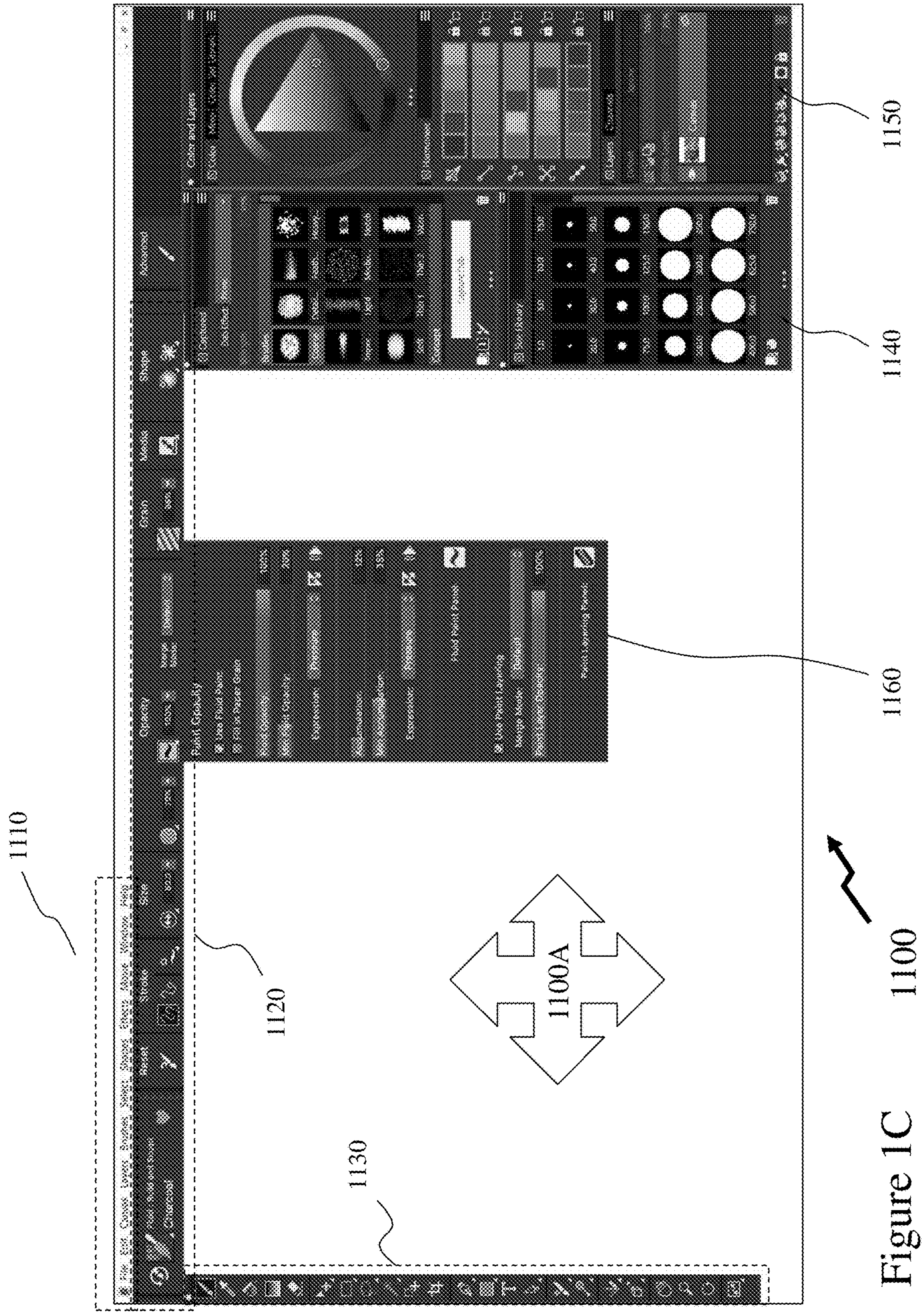
FIG. 1C depicts home screen of a digital graphics editor, digital painting, application according to an embodiment of the invention.

Now referring to FIG. 1C there is depicted a Home Screen 1100 of a digital graphics editor, digital painting, application, the GESGEAP, according to an embodiment of the invention, e.g. Corel™ Painter. Accordingly, within the Home Screen 1100 a user has opened a Window 1100A, which may for example be untextured, textured to mimic a paper, canvas, or other surface for "painting." The Window 1100A being a virtual canvas or virtual surface upon which the user will apply mark making tools etc. Optionally, a texture may be applied prior to the user beginning work, during their work, or upon its completion. Similarly, other effects may be added by the user through the Menu Bar 1110 including employing multiple layers with different effects and/or properties, different illuminations, etc. as known within the art. The user is also presented with a series of menus that "flu-out", drop-down etc. or may be manipulated, docked, undocked and moved with respect to the Home Screen 1100. The series of menus allow the user to select, adjust, modify, add, delete, and control various aspects of their interaction with the GESGEAP. These include, but are not limited to:

- Mark Making Tool Selector and Settings 1120;
- Main Menu 1130;
- "Dab" Menu 1150, where a dab is a method of applying a medium to a canvas which can be brushstrokes, stamps, etc.;
- Colour Menu 1180 wherein the user can adjust the colour of the applied medium; and
- Opacity Menu 1160 wherein a user can access common fluid paint controls associated with brushstrokes according to embodiments of the invention.

Opacity Menu 1160 being a fly-out, drop-down, or dockable menu presented when the user selects the "Opacity" field within the Mark Making Tool Selector and Settings 1120. Accordingly, within Opacity Menu 1160 a user may:

- Enable "Fluid Paint" as described and depicted below with respect to embodiments of the invention;
- Enable "Fill In Paper Grain" as described and depicted below with respect to embodiments of the invention'
- Set the maximum fluid opacity as described and depicted below with respect to embodiments of the invention;
- Set the minimum fluid opacity as described and depicted below with respect to embodiments of the invention;
- Define what expression or expressions are associated with the opacity function;
- Define the accumulation from multiple brushstrokes as described and depicted below with respect to embodiments of the invention;
- Define the minimum accumulation from multiple brushstrokes as described and depicted below with respect to embodiments of the invention;
- Enable "Paint Layering" as described and depicted below with respect to embodiments of the invention;
- Define the mode of merging employed within the paint layering as described and depicted below with respect to embodiments of the invention;
- Define the default paint layer opacity; and
- Select an icon to access a paint layering menu defining the paint layering as described and depicted below with respect to embodiments of the invention.

Accordingly, within the embodiments of the invention described below and in respect of FIGS. 2 to 10 a user may select features and functionalities according to embodiments of the invention and establish aspects of these at different settings through such menus and others as would be evident to one of skill in the art.

Within the following description whilst embodiments of the invention are described and depicted with respect to brushstrokes made with a fluid (e.g. a liquid paint such as an oil paint or watercolour) it would be evident to one of skill in the art that the embodiments of the invention may be applied to other mark making tools and/or simulated media (e.g. pastel, pencil, etc.) without departing from the scope of the invention.

Embodiments of the invention provide users of GESGEAPs with new novel methods for controlling how alpha (pixel opacity) is calculated within mark making methods (brush strokes) applied to a digital image. Embodiments of the invention provide the user with the ability to achieve dynamic control of visible differences in alpha (control of visible opacity overlap between individual marks in a stroke), allowing control of how to increase or reduce alpha.

Within prior art GESGEAPs differences in alpha can be visible and are often not aesthetic. In addition, prior art GESGEAPs have no alpha overlap functionality and tend to be very limited in what they can provide the user in terms of controls. Embodiments of the invention allow for control of opacity overlap whilst not limiting other aspects of the tools within the GESGEAP, for example color mixing. Further, embodiments of the invention allow the user to control dynamically the opacity and/or control dynamically the increase or decrease of the opacity with multiple brushstroke overlaps.

Embodiments of the invention allow a user of a GESGEAP to limit the visible opacity increase (or decrease) in between marks of a mark making tool such that the visual result to a viewer of the digital image has very smooth opacity variation within the marks. This is achieved whilst still retaining other mark making capabilities such as color blending etc. In addition, the embodiments of the invention allow for opacity to increase or decrease dynamically (e.g. using pressure or other controlling options) to allow the marks to visually increase or decrease the opacity withing the overlapping regions between consecutive marks.

Accordingly, embodiments of the invention provide a user with a tool with various settings within a GESGEAP. These settings determine how the tool behaves. It would be evident that within the digital image, there needs to be color components for display, as well as an alpha component (opacity) which controls the calculated opacity of each pixel, and an input device (e.g. tablet, mouse, stylus etc.) to interact with the tool such that a computer system can obtain the settings and/or brushstrokes to which it then execute the method(s) according to embodiments of the invention.

The inventor refers to the concepts according to embodiments of the invention as "fluid paint" and the technology as fluid paint brush technology which offers designers smoother brush marks whilst enabling bolder and more revealing paper grain that is visible across the entire brushstroke. Fluid paint allows for highly adaptable, fluid paint brush marks to be built up slowly, with or without overlapping, and provides the user with a painting and blending experience within the digital domain that is closer to that experienced by a painter in the real world. The techniques are beneficial to artists specializing in concept, matte, comic, manga, anime, and other traditional media, were fluid paint allows the user to control the opacity of all brushstrokes applied to a layer. Fluid paint also offers a glazing capability that is closer to that experienced in the real world with exceptional levels of transparency and opacity from soft and muted to fully opaque. The concepts outlined with respect to embodiments of the invention for fluid paint are compatible with other brush methods within GESGEAPs such as the "Enhanced Cover" and "Thick Paint" within Corel™ Painter™. Fluid paint technology is also compatible with graphical processor unit (GPU) acceleration on default layers for optimal brushing performance.

Figures 2, 3:
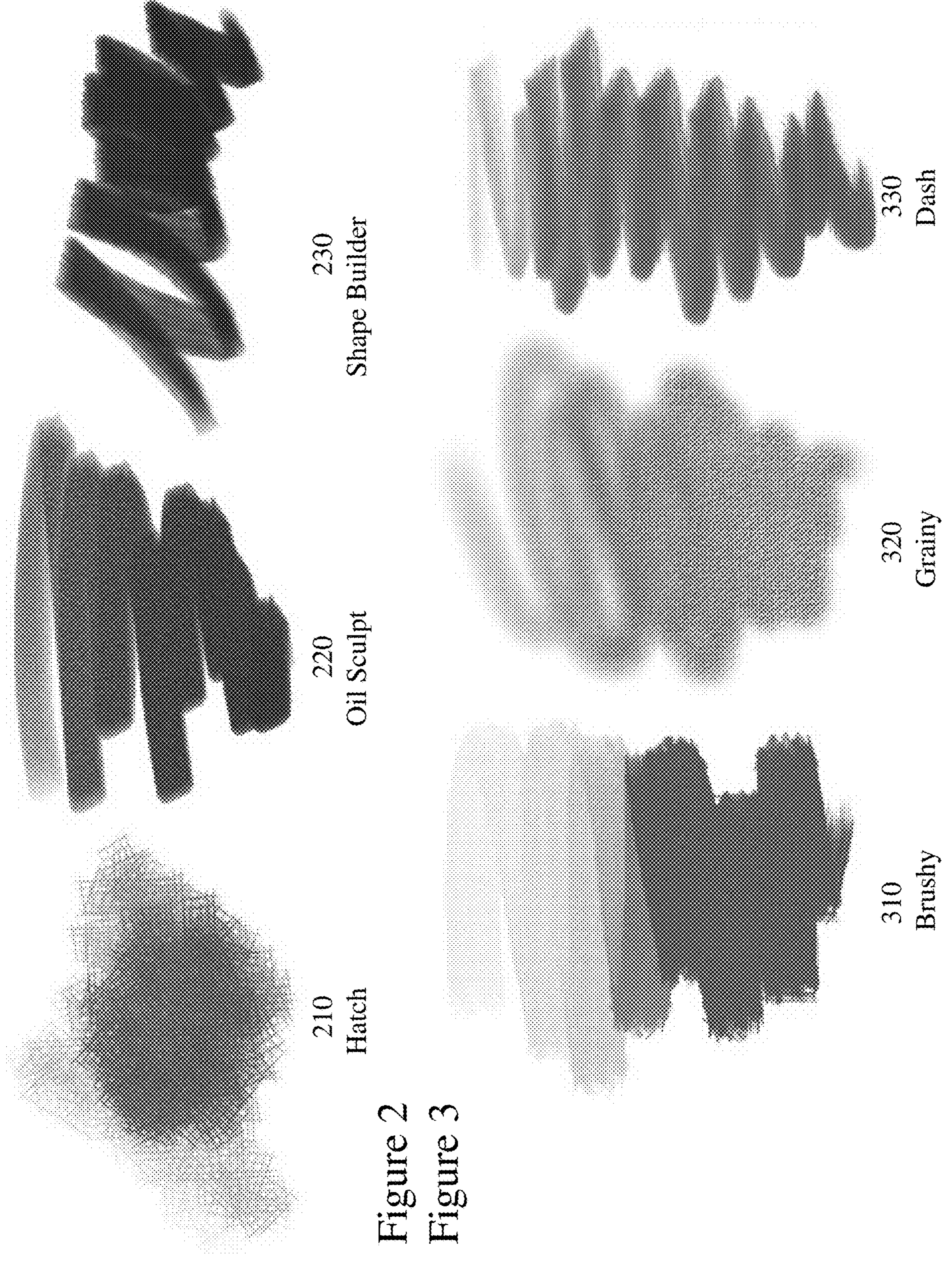
FIG. 2 depicts examples of brushstrokes exploiting "build and sculpt" tools according to embodiments of the invention that exploit a fluidic paint's ability to smoothly build up.
FIG. 3 depicts examples of brushstrokes exploiting "paint and blend" tools that allow the user to adjust blending of new brushstrokes and/or reflect the underlying canvas texture.

Within a GESGEAP supporting embodiments of the invention the user can exploit the fluid paint technology through GESGEAP features such as "Build and Sculpt" or "Paint and Blend." Within "Build and Sculpt" a user is presented with tools that exploit and employ embodiments of the invention where their initial settings have been defined with the focus on illustration, storyboarding, comic art, and manga. Such brushes, designed for blocking in shapes or filling in color, exploit fluid paint's ability to smoothly build up at lower opacity values. Some fluid variants reveal shape and structure, with enhanced grain rendering and a wet, oily feel, while others produce tighter, polished airbrush marks. Referring to FIG. 2 there are depicted first to third Images 210 to 230 which depicts examples of brushstrokes exploiting "build and sculpt" tools according to embodiments of the invention exploiting fluidic paint's ability to smoothly build up. These brushes being referred to, for first to third Images 210 to 230 respectively, as Hatch, Oil Sculpt, and Shape Builder respectively.

In contrast within "Paint and Blend" a user is presented with tools that offer a more traditional "feel" or result where their initial settings have been defined with a focus on illustrators, fine art, and photo artists. Such brushes paint smoothly in low opacities, and may feel wet or oily. These brushes also blend with a range of options from the subtle application of paint through to heavily mixing with the layer content. Fluid brushes may also be configured by default or user setting, with an improved ability to render paper grain. Referring to FIG. 3 there are depicted first to third Images 310 to 330 which depicts examples of brushstrokes exploiting "paint and blend" tools according to embodiments of the invention exploiting fluidic, These brushes being referred to, for first to third Images 210 to 230 respectively, as Brushy, Grainy, and Dash respectively.

Figure 4:
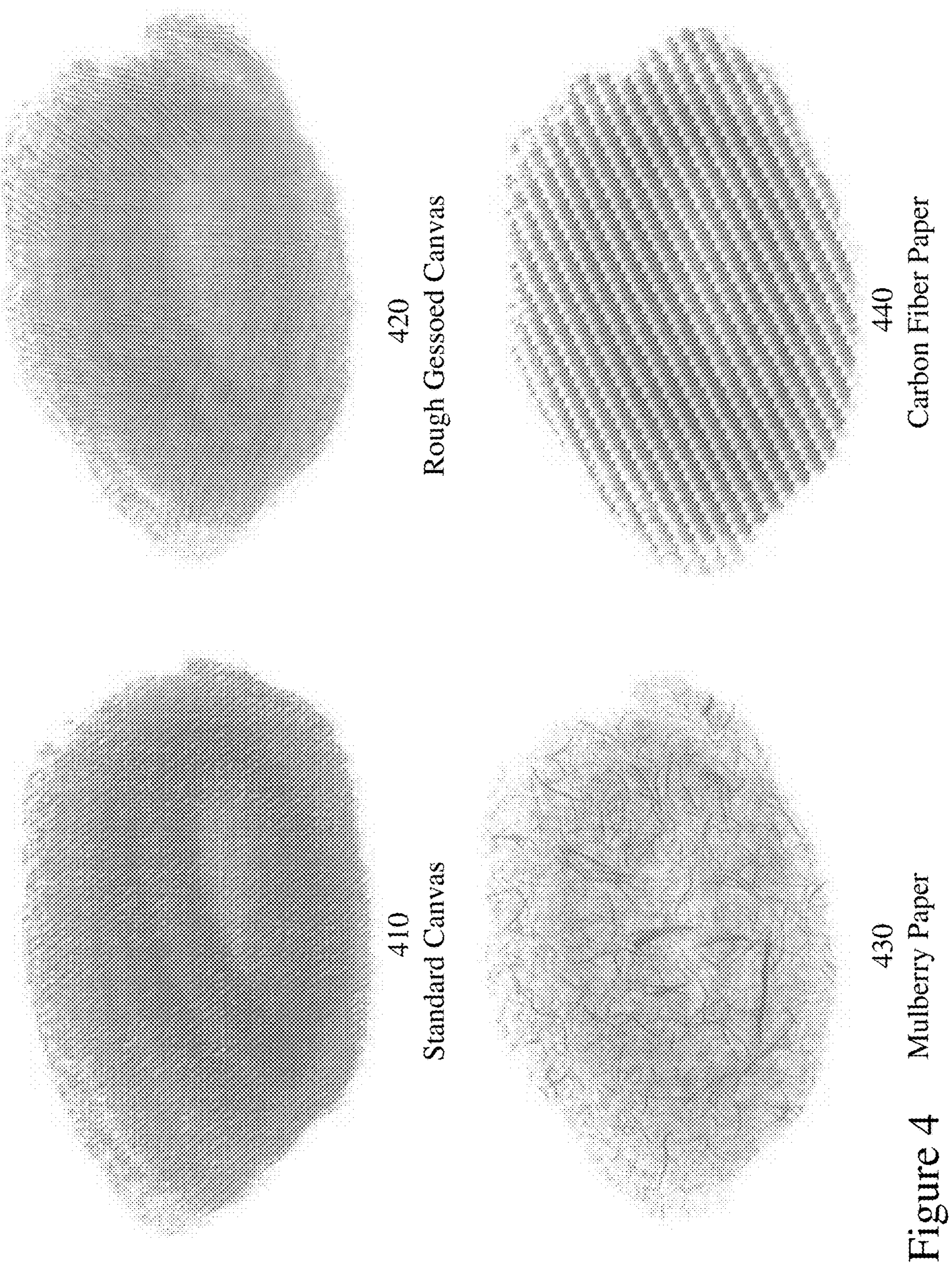
FIG. 4 depicts examples of brushstrokes applied to different canvas textures simulating different canvas and papers where a fluid paint's behaviour upon application is impacted by the grain of the canvas.

The inventor has also established in addition to the improved brushes according to embodiments of the invention enhanced virtual canvases which they refer to as "fluid papers." These allow a user to add new, high contrast paper textures to their work from a collection of paper textures designed specifically to take advantage of the expressive grain behavior of fluid paint. Referring to FIG. 4 there are depicted exemplary fluid brushstrokes applied to four fluid papers in first to fourth images 410 to 440 respectively. These being Standard Artist Canvas, Rough Gessoed Canvas, Mulberry Paper (also known as Kozo paper) and Carbon Fiber Paper respectively.

The paper texture defines a spatial variation of a "paper" (e.g. surface) employed as a canvas to which the mark making tool is applied and the spatial variation defines a resulting opacity variation. For example, with respect to Carbon Fiber paper, and others, the spatial variation is that of a height of the surface such that the fluid paint when applied is thin in higher regions of the paper and thicker in lower regions resulting in higher opacity in these lower regions relative to the higher regions. For watercolors this may be viewed as the watercolour initially pooling such that more pigment is absorbed in the deeper regions.

The paper texture defines a spatial variation of a "paper" (e.g. surface) employed as a canvas to which the mark making tool is applied and the spatial variation defines a resulting opacity variation. For example, with respect to Mulberry Paper, and others, the spatial variation defines an ability of the paper to absorb or retain a pigment such that such natural materials can be mimicked within the digital graphics environment.

Embodiments of the invention, collectively referred to as fluid paint, allow a user to control the level of opacity for all brushstrokes applied to a layer. Accordingly, with fluid paint a user can produce brush marks that accumulate gently and predictably, with heightened control of opacity, grain, and blending. By enhancing the range of opacity for brushstrokes, fluid paint gives the user more control over its expression so that the user can paint and blend more naturally. The Fluid Paint panel, see FIG. 1C, provides the user with controls to adjust grain behavior, opacity levels, paint accumulation, and expression settings of fluid paint brushstrokes. The user can add fluid paint with brushes that support other features, such as "Enhanced Cover" methods by enabling the "Use Fluid Paint" check box in a menu, for example Opacity Menu 1160 in FIG. 1C, or the user can choose a fluid brush variant from the "Build and Sculpt" or "Paint and Blend" fluid brush categories as well as others that may be defined by the developer of the GESGEAP.

It was noted above that fluid paint as developed by the inventor incorporates fluid paper textures which work with the fluid brushes to provide a bolder, more revealing grain that produces visible paper texture across the entire brushstroke. The user can also toggle legacy grain behavior, which produces visible paper texture at the edges of the brushstrokes by enabling the "Fill In Paper Grain" check box in the GESGEAP, e.g. within the Opacity Menu 1160. Within the "Fill In Paper Grain" mode the GESGEAP automatically in-fills those portions of the brushstrokes within the periphery in a manner that the paper texture or grain is removed to simulate an accumulation of medium from multiple brushstrokes. Within this option disabled the GESGEAP renders the brushstroke with the grain/paper texture in dependence upon the combination of the properties of the brushstrokes over that region.

Figures 5, 6:
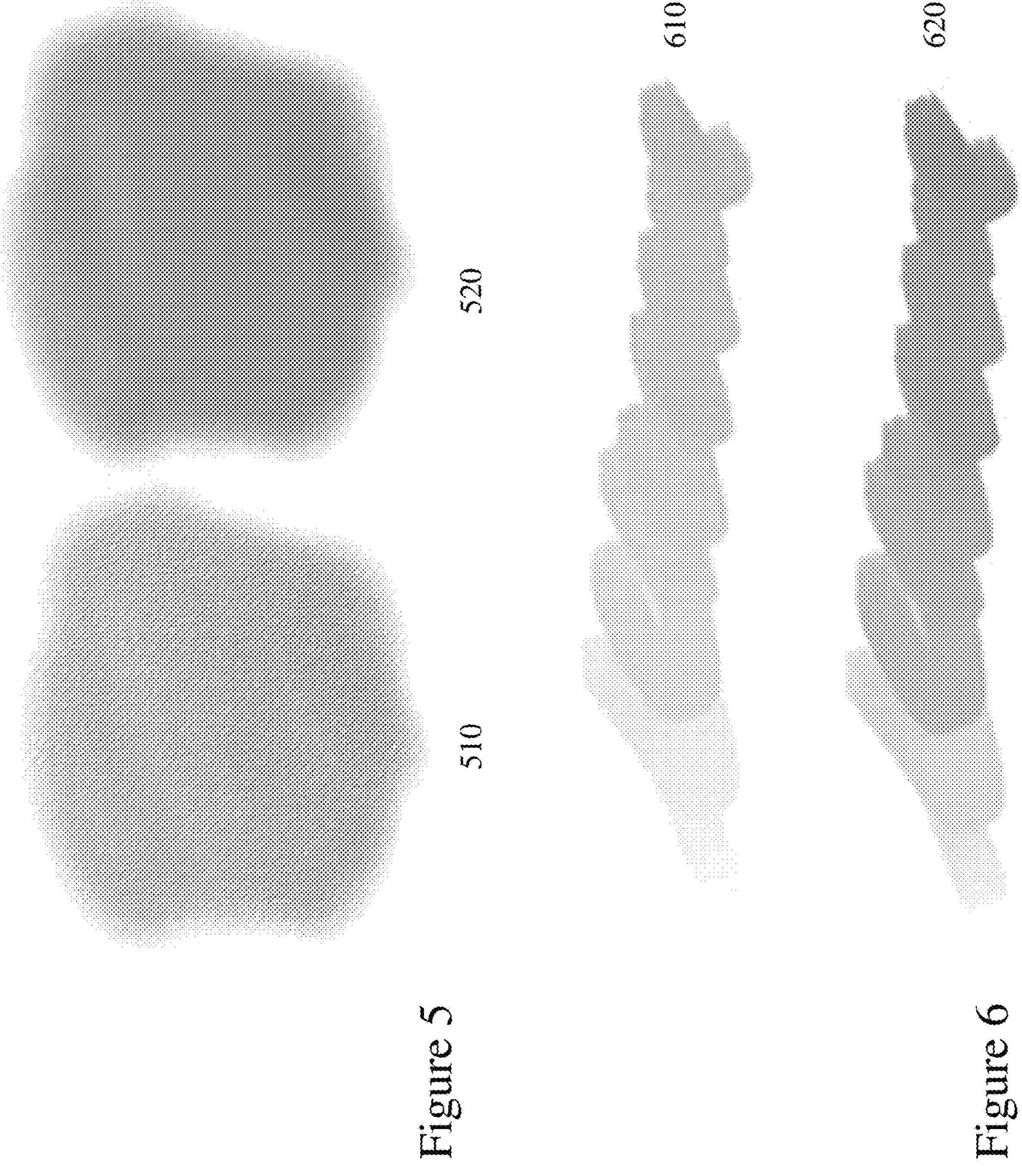
FIG. 5 depicts examples of brushstrokes applied to a canvas without enabling a "fill in" feature that automatically simulates either thick fluid paint application or multiple applications due to the grain of the canvas according to embodiments of the invention.
FIG. 6 depicts examples of brushstrokes wherein a fluid opacity is varied to adjust a maximum opacity for all brushstrokes applied to a layer within a software tool according to an embodiment of the invention.

Referring to FIG. 5 there are depicted examples of brushstrokes applied to a canvas with and without enabling the "fill in" ("Fill In Paper Grain") feature that automatically simulates either thick fluid paint application or multiple applications due to the grain of the canvas according to embodiments of the invention. A brushstroke on a Standard Artist Canvas from a library of Fluid Papers is depicted in first Image 510 with the default fluid paint grain setting, and with the "Fill In Paper Grain" option enabled in second Image 520.

Through a menu, such as Opacity Menu 1160 in FIG. 1C, a user may select to use Fluid Paint features according to embodiments of the invention. For example, the user may through one or more interactions with the GESGEAP establish a sequence of choosing Window▶ Brush Control Panels ▶ Brush Media▶ Fluid Paint and then within the Fluid Paint panel, e.g. Opacity Menu 1160, enable the "Use Fluid Paint" check box. To simulate prior art brushstrokes the user enables "Fill in Paper Grain" check box and then defines the maximum amount of opacity for all brushstrokes applied to the layer, by dragging the "Fluid Opacity" slider where higher values produce more opaque brushstrokes. The user then defines the minimum amount of opacity for all brushstrokes applied to the layer by dragging the "Min Fluid Opacity" slider which can use an expression, such as pressure of a stylus for example, for more control of the opacity.

Referring to FIG. 6 there are depicted examples of brushstrokes wherein a fluid opacity is varied to adjust a maximum opacity for all brushstrokes applied to a layer within a software tool according to an embodiment of the invention. First Image 610 depicts a brushstroke with the "Fluid Opacity" set to 50% whilst second Image 620 depicts a brushstroke with "Fluid Opacity" set to 100%.

Figures 7, 8:
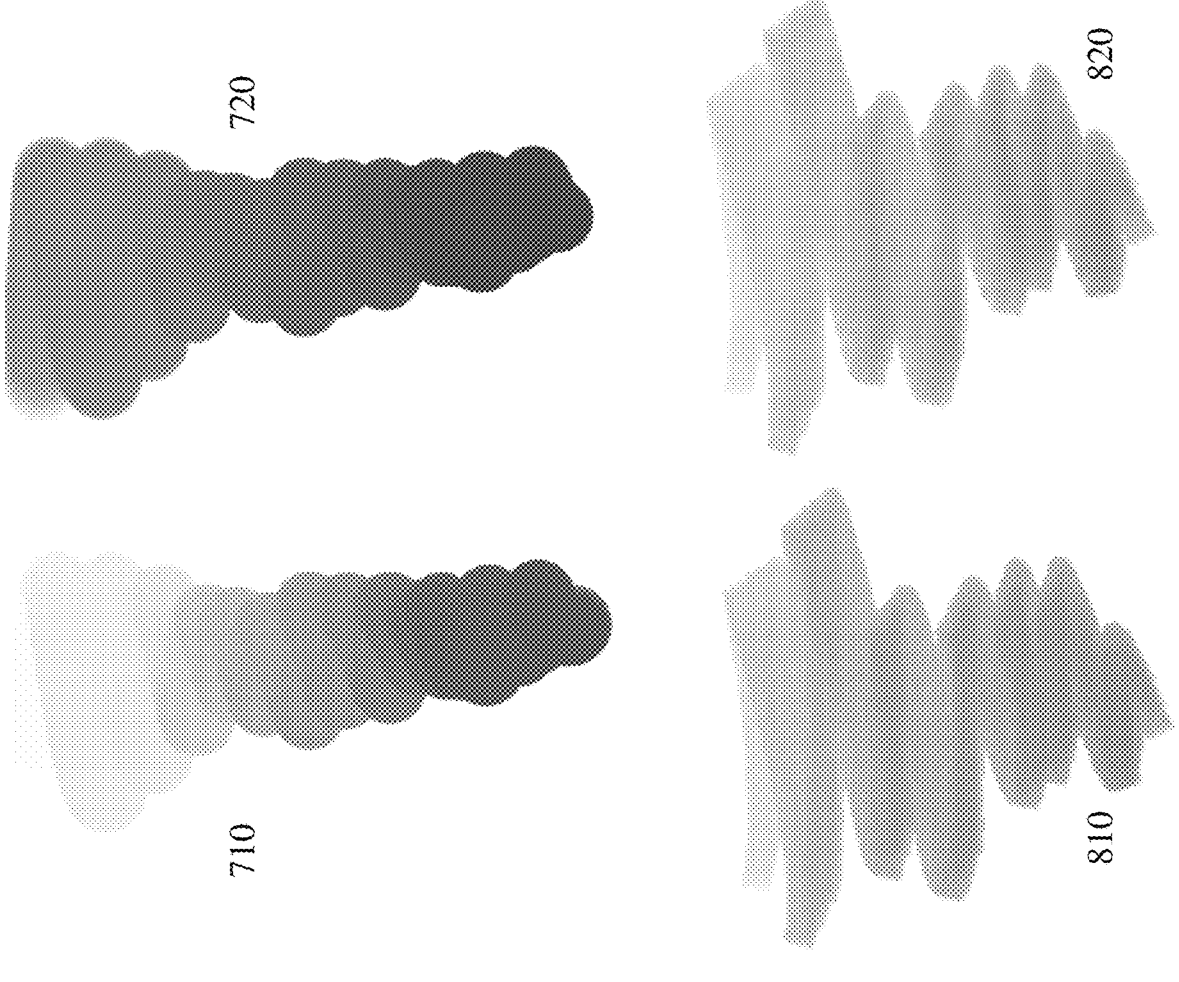
FIG. 7 depicts examples of brushstrokes wherein a fluid opacity is varied to adjust a minimum opacity for all brushstrokes applied to a layer within a software tool according to an embodiment of the invention.
FIG. 8 depicts examples of brushstrokes wherein a fluid opacity factor is dynamically varied during a brushstroke though the application of a jitter function to the opacity for all brushstrokes applied to a layer within a software tool according to an embodiment of the invention.

Now referring to FIG. 7 there are depicts examples of brushstrokes wherein a fluid opacity is varied to adjust a minimum opacity for all brushstrokes applied to a layer within a software tool according to an embodiment of the invention. First Image 710 depicts a brushstroke with "Fluid Opacity" set to 100% and "Min Fluid Opacity" set to 50% whilst second Image 720 depicts a brushstroke with "Fluid Opacity" set to 50% and "Min Fluid Opacity" set to 50%.

Within embodiments of the invention the user is able to set a range of opacity variability. This is controlled by the "Fluid Opacity Jitter" slider in the Opacity Menu 1160 in FIG. 1C. Higher values produce brushstrokes with higher variability in the levels of opacity through the brushstroke. Referring to FIG. 8 there are depicted examples of brushstrokes wherein a fluid opacity factor is dynamically varied during a brushstroke though the application of a jitter function to the opacity for all brushstrokes applied to a layer within a software tool according to an embodiment of the invention. First Image 810 depicts a brushstroke with "Fluid Opacity Jitter" set to 10% whilst second Image 820 depicts a brushstroke with "Fluid Opacity Jitter" set to 95%.

Figures 9, 10:
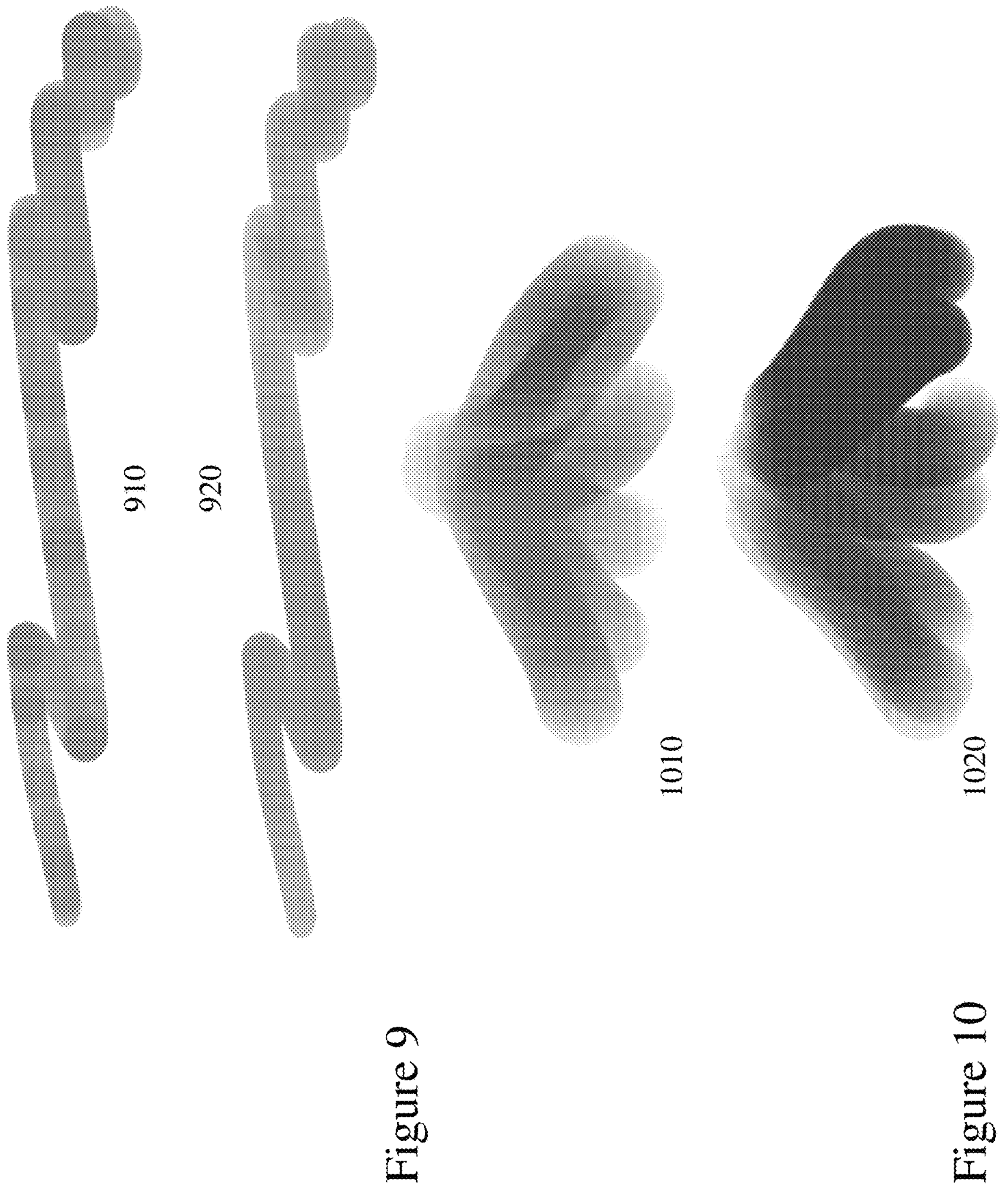
FIG. 9 depicts examples of brushstrokes wherein a fluid opacity smoothing factor is varied between different brushstrokes to smooth transitions between different opacity levels within a software tool according to an embodiment of the invention.
FIG. 10 depicts examples of brushstrokes wherein a rate of accumulation of a fluid paint from a brushstroke is varied between different brushstrokes within a software tool according to an embodiment of the invention.

As noted above on aspect of opacity within prior art GESGESAPs is the discontinuous nature of opacity within a brushstroke or from multiple brushstrokes leading to a sense of "artificiality" to the generated image. The inventor has addressed this within the embodiments of the invention through allowing the user to define a smoothing applied to the opacity variability within the brushstrokes. In order to adjust this the user drags the "Fluid Opacity Smoothness" slider within the rendered menu where higher values produce brushstrokes with smoother transitions between opacity levels. FIG. 9 depicts examples of brushstrokes wherein a fluid opacity smoothing factor varies between different brushstrokes to smooth transitions between different opacity levels within a software tool according to an embodiment of the invention. First Image 910 depicts a brushstroke with "Fluid Opacity Smoothness" set to 20% whilst second Image 920 depicts a brushstroke with the "Fluid Opacity Smoothness" set to 100%.

A user may use an expression to control fluid opacity wherein they choose an option from the "Expression" list box, such as pressure for example. The user can also reverse the effect of the expression by clicking an "Invert Fluid Opacity Expression" button within the menus of the GESGEAP. An expression may be audio.

Within embodiments of the invention a user can set the rate of accumulation with respect to the fluid opacity level. For example, the user may drag an "Accumulation" slider where higher values will produce more accumulation with each brushstroke, but will not exceed the maximum fluid opacity defined. Referring to FIG. 10 there are depicted examples of brushstrokes wherein a rate of accumulation of a fluid paint from a brushstroke is varied between different brushstrokes within a software tool according to an embodiment of the invention. First Image 1010 depicts a brushstroke with "Accumulation" set to 30% whilst second Image 1020 depicts a brushstroke where the "Accumulation" is set to 30% but a "Min Accumulation" setting was also set to 50%.

The "Min Accumulation" defines the minimum rate of accumulation toward the maximum fluid opacity level and may be similarly set through a slider or alternatively be linked to an expression for more control of accumulation.

Figure 11:
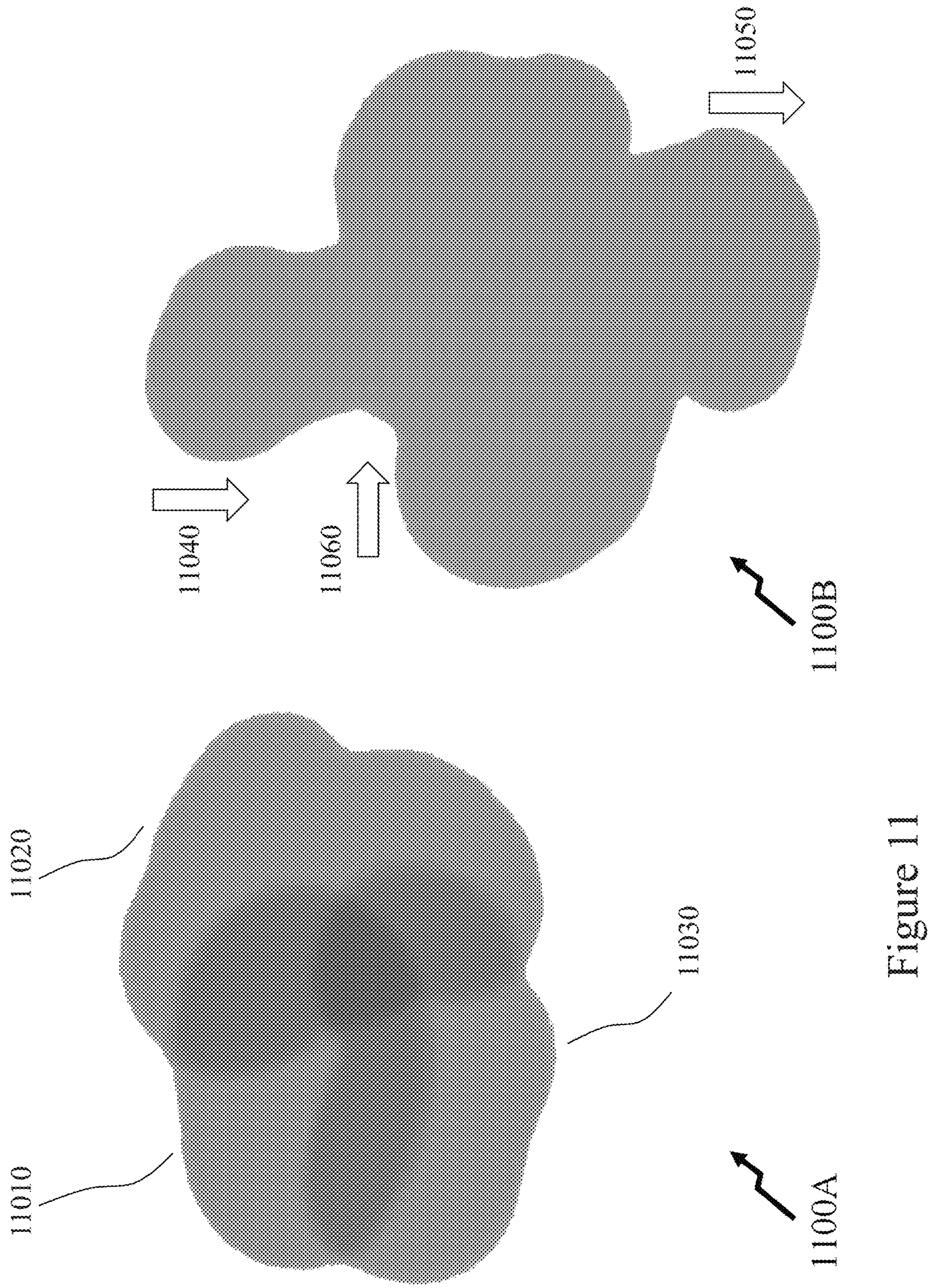
FIG. 11 depicts the overlap of multiple brush strokes from a prior art graphics software application and a graphics software application executing according to embodiments of the invention.

Referring to FIG. 11 there is depicted the overlap from multiple brush strokes from a prior art graphics software application and a graphics software application executing according to embodiments of the invention. First Image 1100A depicts a series of brushstrokes from a brush according to the prior art where each brushstroke is smooth within itself, there is no colour mixing between the strokes of different colours and the multi-stroke overlap is clearly evident as shaded regions. Further, the GESGEAP to achieve this required that the user establish temporary layers to place each stroke on leading to a performance degradation. The first Image 1100A comprising first and second Strokes 11010 and 11020 in a first colour and third Stroke 11030 in a second colour.

However, second Image 1100B depicts the result of fourth and fifth Strokes 11040 and 11050 in the first colour going top to bottom (or vice-versa) and a sixth Stroke 11060 in the second colour from left to right (or vice-versa). The result is that each stroke where discretely displayed is smooth within itself but there is now a smooth multi-stroke rendering together with colour mixing as well as allowing the provisioning for other features such as grainy edges, canvas texture, opacity smoothing, opacity jitter, etc. as described above with respect to embodiments of the invention. Beneficially, the methods according to embodiments of the invention allow for the multi-stroke, colour mixing etc. to be achieved within a canvas without requiring additional layers or hidden layers. Further, a user once they have set the stroke options can proceed without requiring that they define any merge modes for each subsequent stroke as the rules for overlapping strokes and their limits have been defined by the user settings within the menu, e.g. Opacity Menu 1160 in FIG. 1.

Within the preceding description sliders have been described as the menu mechanism for a user selecting a level with respect to a setting for a fluid paint brushstroke such as opacity, smoothness, jitter and accumulation for example. However, it would be evident that the user may specify these values through other graphical user interface elements. Further, the opacity established for each brushstroke alone and for subsequent overlapping brushstrokes is defined by an opacity graphics engine or set of algorithms executing within or in conjunction with a GESGEAP.

Whilst the embodiments of the invention have been described and depicted with respect to brushstrokes combining to increase opacity embodiments of the invention also support that brushstrokes can combine to decrease opacity or that the opacity may be increased/decreased for a subsequent brushstroke based upon a value of an expression for example.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a sub-program, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

receiving one or more user inputs relating to one or more settings employed by a graphics engine forming part of a graphics application in execution upon a microprocessor;

receiving one or more other user inputs defining application of a mark making tool with respect to a virtual canvas; and generating with the graphics engine in dependence upon the one or more user inputs and the one or more user inputs an opacity of a mark made by the mark making tool during its application; wherein the opacity of the mark generated by the mark making tool is further established in dependence upon previous marks made in those regions of a virtual canvas across which the mark making tool traverses during its application.

2. The method according to claim 1, wherein each setting of the one or more settings is selected from the group comprising a maximum opacity, a minimum opacity, an accumulation and a minimum accumulation.

3. The method according to claim 1, wherein generating the opacity of the mark made by the mark making tool is further established in dependence upon previous marks made in those regions of a virtual canvas across which the mark making tool traverses during its application; and the opacity after the application of the mark made by the mark making tool is one of an increase in opacity and a reduction in opacity.

4. A method comprising:

establishing a paper texture from a set of paper textures based upon a selection by a user;

receiving one or more user inputs relating to one or more settings employed by a graphics engine forming part of a graphics application in execution upon a microprocessor;

receiving one or more other user inputs defining application of a mark making tool with respect to a virtual canvas; and generating with the graphics engine in dependence upon the one or more user inputs, the one or more user inputs, and the paper texture an opacity of a mark made by the mark making tool during its application; and the opacity of the mark generated by the mark making tool is further established in dependence upon previous marks made in those regions of a virtual canvas across which the mark making tool traverses during its application.

5. The method according to claim 4, wherein the paper texture defines a spatial variation of a paper employed as a canvas to which the mark making tool is applied; and the spatial variation defines a resulting opacity variation.

6. The method according to claim 4, wherein the paper texture defines a spatial variation of a paper employed as a canvas to which the mark making tool is applied;

the spatial variation defines a resulting opacity variation; and the spatial variation is at least one of a spatial variation of a height of a surface of the paper and a spatial variation of at least one of absorbing and retaining a pigment within a medium applied with the mark making tool.

7. The method according to claim 4, wherein each setting of the one or more settings is selected from the group comprising a maximum opacity, a minimum opacity, an accumulation and a minimum accumulation.

8. The method according to claim 4, wherein generating the opacity of the mark made by the mark making tool is further established in dependence upon previous marks made in those regions of a virtual canvas across which the mark making tool traverses during its application; and the opacity after the application of the mark made by the mark making tool is one of an increase in opacity and a reduction in opacity.

* * * * *